Figure 1:
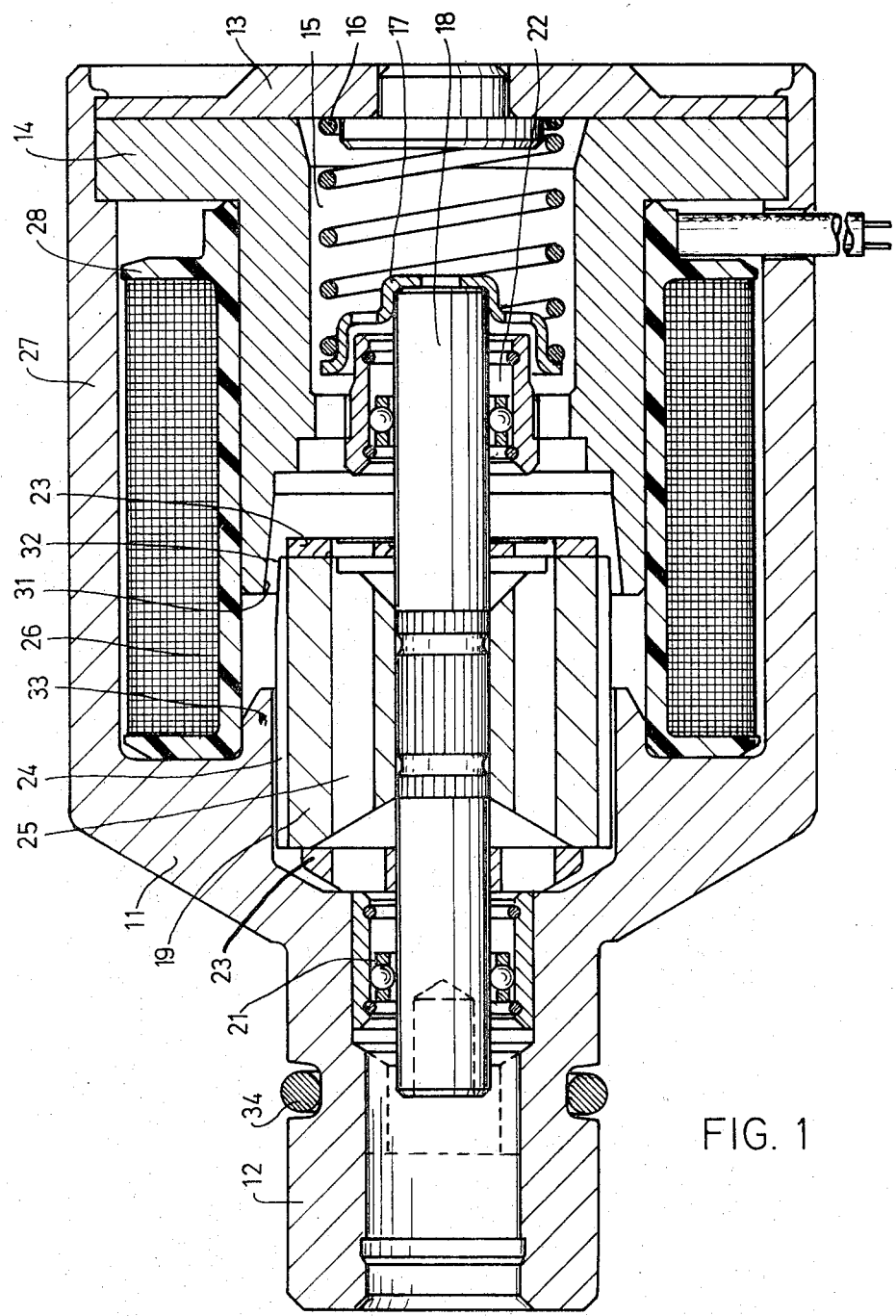

United States Patent [19]
Rothfuss et al.

[11] 3,851,285
[45] Nov. 26, 1974

[54] CONTROL MAGNET FOR HYDRAULIC CONTROL SYSTEM VALVES

[75] Inventors: Georg Rothfuss, Ditzingen; Heinz Gand, Stuttgart; Wolfgang Bredenbrock, Schwieberdingen; Wilfried Paul Böhringer, Flein, all of Germany

[73] Assignee: Robert Bosch GmbH, Stuttgart, Germany

[22] Filed: Oct. 10, 1973

[21] Appl. No.: 405,101

[30] Foreign Application Priority Data
Nov. 11, 1972 Germany............................ 2255272

[52] U.S. Cl.................. 335/261, 335/262, 251/129
[51] Int. Cl. ............................................. H01f 7/08
[58] Field of Search .......... 335/255, 257, 260, 262, 335/251, 261, 258; 251/129

[56] References Cited
UNITED STATES PATENTS
| | | |
|---|---|---|
| 1,293,052 | 2/1919 | Dinsmoor ........................... 335/261 |
| 3,035,139 | 5/1962 | Lindsay............................ 335/255 X |
| 3,510,814 | 5/1970 | Nordfors............................. 335/262 |

Primary Examiner—G. Harris
Attorney, Agent, or Firm—Flynn & Frishauf

[57] ABSTRACT

A control magnet for a valve of a hydraulic control system has an armature axially movable on a shaft mounted in bearings for axial displacement. A compression spring between one end of the shaft and an end of the casing surrounding the device has a stiffness low enough so as to push the armature partly out of the coil all the way to its rest position from any initial position. The armature has longitudinal bores and grooves so that the surrounding medium will not interfere with quick operating time of the magnet. An annular core extends part way inside the winding and surrounds the compression spring.

14 Claims, 2 Drawing Figures

CONTROL MAGNET FOR HYDRAULIC CONTROL SYSTEM VALVES

This invention relates to control magnets, and particularly magnets for positioning a control member such as the plunger, gate or vane of a hydraulic valve of a control system.

Control valves for hydraulic systems find a great deal of use in the usual form of automatic transmission system used on motor vehicles. Most automatic transmissions utilize a hydrodynamic energy converter for applying brake bands and couplings for shifting from one gear to another in an automatic transmission. These elements are controlled by a hydraulic system. From the main pressure of the fluid in the hydraulic system the control pressures are derived for the control of the gear shifting valves. The control operation should proceed in such a manner that gear shifting can be accomplished without jerks.

In automatic transmissions for motor vehicles heretofore used the vacuum in the intake pipe has been used as an indication of the operating condition of the motor. Because of various measures that have been taken for detoxification of exhaust gases, however, the intake vacuum can no longer serve as a control factor for a transmission system. The operating condition of the motor must therefore be indicated automatically by an electromagnetic control member. Control magnets for magnetic valves are known that operate with a short stroke and therefore can modify a control pressure relatively quickly. The known control magnets are nevertheless very bulky and have a high current consumption.

It is an object of this invention to provide a control magnet with a relatively long stroke, of compact construction and of reasonable power consumption.

SUBJECT MATTER OF THE PRESENT INVENTION

Briefly, a control magnet of the solenoid type is provided with an armature mounted on an axial rod guided in bearings near its ends or, within a casing that completes the magnetic path of the device. A compression spring with very low stiffness is compressed between the casing and one end of the rod. Because of the use of such a spring the magnetic force is substantially proportional to the electric control current. If the control magnet is arranged to operate a primary control gate valve in a hydraulic system, a power-current characteristic results that is very close to the desired negative proportionality. The armature body is provided with elongated cavities disposed parallel to the axis of the body. These may be grooves or bearings, or both, which permit the surrounding medium, whether air or oil, to flow through and thus make possible a short operating time for the actuation of the control magnet. By the provision of low-friction bearings for the armature rod, an extraordinarily small degree of hysteresis is obtained. The arrangement has a sturdy construction that provides a long useful life for the control magnet.

The housing has two re-entrant hollow cylindrical members, into one or the other of which the armature body moves towards its extreme positions. In its rest position one of these members overlaps the armature body for over half its length, being separated from it by a small air gap. In that position the re-entrant hollow cylindrical member barely overlaps the end of the armature body (not counting the rod or plunger as part of the armature body). This re-entrant cylindrical member has a tapered inner surface and the corresponding longitudinal end of the armature body is similarly tapered.

Figure 2:
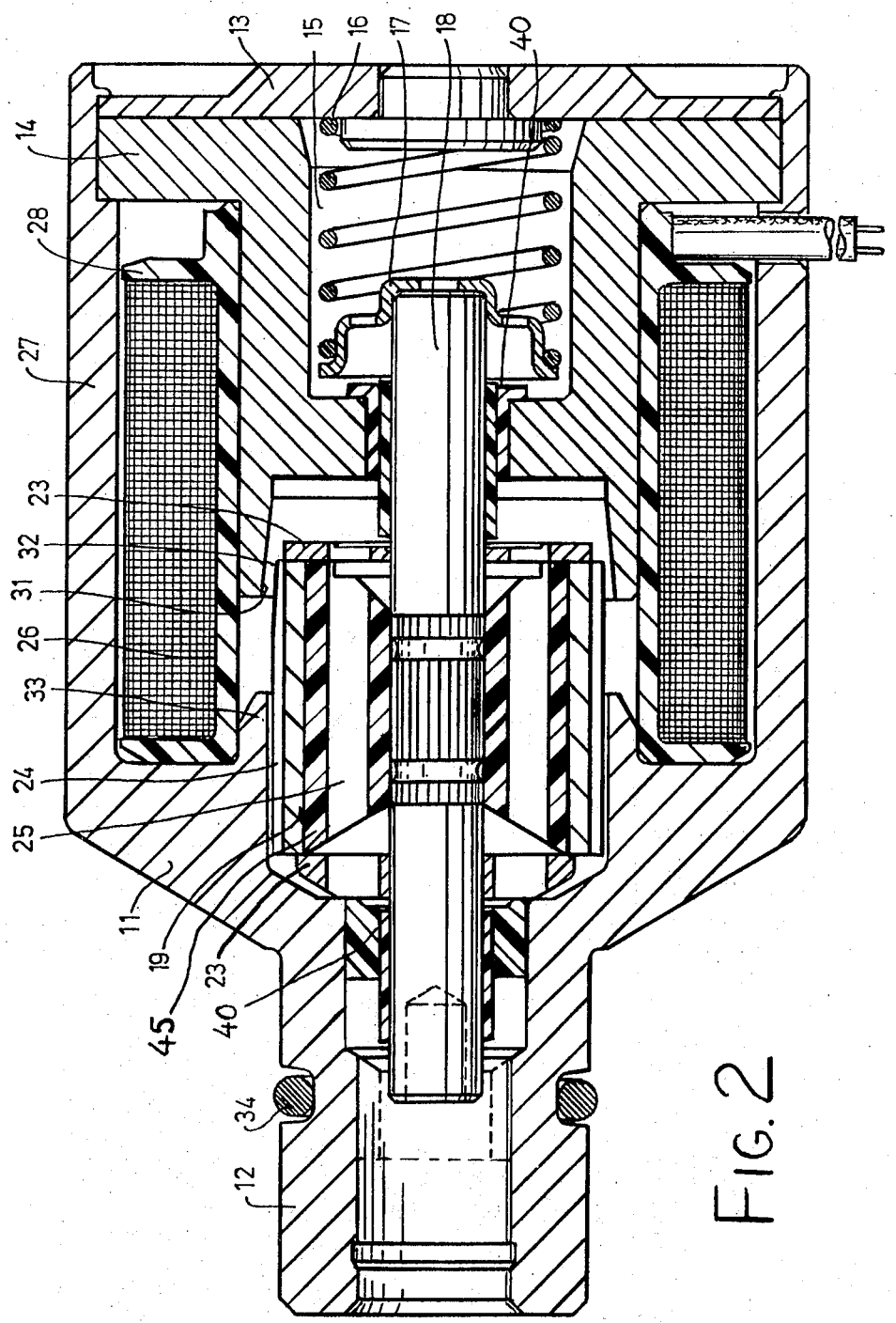

The invention is illustrated by way of example with reference to the accompanying drawing, in which:

FIG. 1 is a longitudinal cross section of a control magnet according to the invention; and FIG. 2 is a longitudinal section of a modified form of control magnet according to the invention.

The embodiment of the invention shown in FIG. 1 has a cylindrical casing 11 tapered at one end to neck-like extension 12 and provided with a closure across its other end in the form of the cover 13. A cylindrical core 14, in the form of a re-entrant hollow cylinder with an axial cavity 15 is fastened to the cover 13 and extends down into the interior of the casing 11. In the central cavity 15 of the core 14 a helical compression spring 16 is arranged which is compressed between the cover 13 and a cap 17 which the spring tends to push towards the middle of the casing 11. The cap 17 pushes against the axial plunger rod 18 of a cylindrical armature 19. The rod 18 is rotatable in the neck-like extension 12 and is mounted for axial movement in a ball bearing 21 that has the usual components of such a bearing. The rod 18 is also mounted in a ball bearing 22 at the end at which it engages the compression spring 16, the ball bearing 22 being mounted inside the tubular body of the core 14. The armature body 19 carries anti-sticking discs 23 on each of its end surfaces.

The armature body 19 is provided with longitudinal grooves 24 running in the axial direction and is also provided with longitudinal borings 25, likewise running axially. An annular coil winding 26 is located in the casing 11 along the inner side of the casing wall 27. The coil is wound on a spool 28 which is inserted into the casing 11 from its wide end. The core 14 has an outwardly extending end flange flush with the cover 13 that extends out to meet the casing wall 27. The tubular part of the core 14 extends from this flange down into the casing interior, between the spring 16 and the spool 28 until it reaches and slightly overlaps the armature body 19. Its inner surface has a tapered portion 31 at its end facing the armature 19. The armature 19 is likewise provided with a tapered surface 32 at the end facing the core 14.

At the end of the casing near the neck portion 12 is a short re-entrant hollow cylinder portion 33 which extends along the inner surface of the spool 28 for a short distance and surrounds the rest position of the armature body 19, from which it is separated by a narrow air gap. In a radial groove in the neck-like extension 12 of the casing 11 a ring seal member 34 is seated that serves as a seal when the control magnet is connected to an adjacent hydraulic system.

If an electric current is applied to the winding 26, the magnetic field that is set up pulls the armature out of its rest position. The armature is axially movable. It therefore moves out from its socket in the hollow of the re-entrant cylinder 13 of the housing and protrudes into the inner cavity 15 of the core 14. Sticking of the armature 19 to the casing 11 or to the core 14 is prevented by the provision of the anti-sticking end discs 23 on the ends of the armature body 19.

The casing may be made of drawn metal, for example, preferably of magnetically soft material for completing the path for the magnetic flux. Instead of ball or roller bearings, a sliding bearing, a so-called friction bearing, can be provided, preferably with Teflon (polytetrafluoroethylene) layers providing the bearing surfaces, as shown at 40 in FIG. 2. The plunger rod 18 can be press-fitted into the armature body 19, as shown in FIG. 1, but as shown in FIG. 2 it could also be cast or injection molded into a plastic shell, providing a synthetic plastic intermediate layer 45 for interposition between the rod 18 and the armature body 19. Features of the modified form of control magnet shown in FIG. 2 that are the same as those of FIG. 1 are designated by the same reference numerals.

The longitudinal bores 25 can, if so desired, also be inclined in the intermediate layer of synthetic material, so that machine finishing of the metal surface is not necessary in this last-mentioned construction of the armature.

Although the invention has been described with reference to a particular embodiment it is to be understood that modifications and variations may be made within the inventive concept.

We claim:

1. A control magnet suitable for magnetic valves comprising:
   a casing (11);
   an annular magnet winding (26) inside said casing;
   an armature (19) movable within said casing affixed on a rod (18) provided with bearings mounted in said casing for guiding and permitting axial movement of said armature in and out of said winding coaxially therewith, said armature being affixed to said rod at a position on said rod which is between said bearings and being provided with axially extending cavities, (24, 25), said rod having one extremity protruding into said winding and the other extremity wholly outside of said winding; and
   a compression spring held between said casing and the extremity of said rod which protrudes into said winding and arranged to urge said rod out of the space enclosed by said winding.

2. A control magnet as defined in claim 1 in which said compression spring (16) has a stiffness sufficiently small and an axial displacement in compression sufficiently large that said armature (19) is pressed all the way to its end rest position by said spring from any position it may assume when released, whereas the force of said compression spring may nevertheless be overcome by the attraction of the armature from its end rest position when said winding is energized.

3. A control magnet as defined in claim 1 in which at least part of said cavities are axially oriented grooves (24) on the periphery of said armature (19).

4. A control magnet as defined in claim 1 in which at least part of said cavities are bores (25) parallel to the axis of said armature (19).

5. A control magnet as defined in claim 1 in which said bearings are ball bearings disposed for axial movement of said rod.

6. A control magnet as defined in claim 1 in which said bearings are sliding surface bearings provided with polytetrafluoroethylene layers on the bearing surfaces.

7. A control magnet as defined in claim 1 in which said casing (11) provides a ferromagnetic path for the magnetic flux.

8. A control magnet as defined in claim 1 in which near the end of said winding away from said compression spring (16) a re-entrant cylindrical projection (33) of said casing provides a recess into which said end of said armature fits with a peripheral air gap.

9. A control magnet as defined in claim 8 in which in the quiescent position of said armature (19) said recess of said casing (11) closely surrounds said body of said armature for at least half of its axial length.

10. A control magnet as defined in claim 1 in which a tubular core (14) affixed to said casing extends inside said winding and slightly overlaps, without touching, said armature in the rest position of said armature, and also surrounds said compression spring (16).

11. A control magnet as defined in claim 10 in which said body of said armature (19) is beveled towards its end which is nearer to said compression spring (16).

12. A control magnet as defined in claim 11 in which the free end of the inner surface of said core (14) has an outward flare (31).

13. A control magnet as defined in claim 4 in which said armature includes an inner portion made of molded synthetic material forming an intermediate layer between the magnetic portion of said armature and the rod (18) on which said armature is mounted, and in which said bores (25) are located in the portion of said armature which is made of synthetic material.

14. A control magnet as defined in claim 1 in which said rod (18) is a substantially cylindrical rod and has a diameter that is less than half as great as the diameter of said armature (19).

* * * * *